United States Patent
Kade et al.

(10) Patent No.: US 6,842,684 B1
(45) Date of Patent: Jan. 11, 2005

(54) METHODS AND APPARATUS FOR CONTROLLING A BRAKE SYSTEM

(75) Inventors: Alexander Kade, Grosse Pointe Woods, MI (US); William J. Chundrlik, Jr., Rochester Hills, MI (US); Richard K. Deering, Clinton Township, MI (US); Osman D. Altan, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,344

(22) Filed: Sep. 17, 2003

(51) Int. Cl.$^7$ .............................. G06F 19/00; G06G 7/76
(52) U.S. Cl. .............................. 701/70; 701/41; 701/78; 701/79; 477/40; 477/182
(58) Field of Search .............................. 701/41, 70, 78, 701/79, 83, 110; 477/40, 71, 80, 182, 186; 303/138

(56) References Cited

U.S. PATENT DOCUMENTS

| | | | | |
|---|---|---|---|---|
| 4,809,179 A | * | 2/1989 | Klinger et al. ................. | 701/37 |
| 5,577,816 A | * | 11/1996 | Suzuki et al. ................ | 303/174 |
| 6,074,020 A | * | 6/2000 | Takahashi et al. .......... | 303/146 |
| 6,182,000 B1 | * | 1/2001 | Ohta et al. .................... | 701/55 |
| 6,360,150 B1 | * | 3/2002 | Fukushima et al. ........... | 701/41 |
| 6,549,840 B1 | * | 4/2003 | Mikami et al. ............... | 701/69 |
| 6,665,603 B2 | * | 12/2003 | Jindo et al. ................... | 701/96 |
| 2003/0045991 A1 | * | 3/2003 | Isogai et al. .................. | 701/96 |

\* cited by examiner

*Primary Examiner*—Gertrude A. Jeanglaude
(74) *Attorney, Agent, or Firm*—Christopher DeVries

(57) ABSTRACT

Methods and apparatus are provided for controlling a braking system of a vehicle that is moving toward an object. The apparatus includes a vehicle speed (VS) sensor, a steering direction (SD) sensor, at least one sensor configured to provide a distance to the object (DTO) and a processor in operable communication with the braking system and configured to receive the VS, the SD and DTO. The processor is further configured to determine a projected vehicle path (PVP) and a minimum stopping distance (MSD) for the vehicle based at least in part on the VS and the SD, determine whether the object is in the PVP and whether the DTO is less than or equal a threshold distance (TD), determine a required deceleration (RD) for the braking system to substantially reduce the vehicle speed if the object is in the PVP and the DTO is less than or equal the threshold distance (TD), and communicate the RD to the braking system.

15 Claims, 2 Drawing Sheets

METHODS AND APPARATUS FOR CONTROLLING A BRAKE SYSTEM

TECHNICAL FIELD

The present invention generally relates to vehicles, and more particularly to brake control for use in parking and collision avoidance with near-by objects.

BACKGROUND

It is known to detect objects at predetermined distances from a vehicle and generate audible or visual warning to the vehicle operator. Such proximity detection systems are useful for helping the vehicle operator with parking (Parking Assist Systems) and/or navigating in confined spaces (Collision Avoidance Systems). While such systems are useful, they depend upon the operator to take corrective action and do not function automatically.

Accordingly, it is desirable to provide Parking Assist Systems and/or low speed Collision Avoidance Systems that are able to function automatically without reliance on the operator for corrective action. In addition, it is desirable that such systems employ sensors and controllers to not only detect the presence of nearby objects but determine whether such objects lie in the vehicle path based on the state of the vehicle and be able to automatically take corrective action, if possible, to bring the vehicle to a stop and avoid collision with the object. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for controlling the braking system of a vehicle moving toward an object. The apparatus includes a vehicle speed (VS) sensor, a steering direction (SD) sensor, at least one sensor configured to provide a distance to the object (DTO), a processor in operable communication with the braking system and configured to receive the VS, the SD and DTO. The processor is further configured to determine a projected vehicle path (PVP) and a minimum stopping distance (MSD) for the vehicle based at least in part on the VS and the SD, determine whether the object is in the PVP and whether the DTO is less than or equal a threshold distance (TD), determine a required deceleration (RD) for the braking system to substantially reduce the vehicle speed if the object is in the PVP and the DTO is less than or equal the threshold distance (TD) and communicate the RD to the braking system.

A method is provided for controlling the braking system of an vehicle moving toward an object. The method includes the steps of: measuring a vehicle speed (VS), measuring a steering direction (SD) and measuring a distance to the object (DTO). The method also includes the steps of calculating a projected vehicle path (PVP) and minimum stopping distance (MSD) for the vehicle based at least in part on the VS and the SD, determining whether the object is in the PVP and whether the DTO is less than or equal to a threshold distance (TD), calculating a required deceleration (RD) for the braking system to substantially reduce the vehicle speed if the object is in the PVP and the DTO is less than or equal to the TD and communicating the RD to the braking system.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
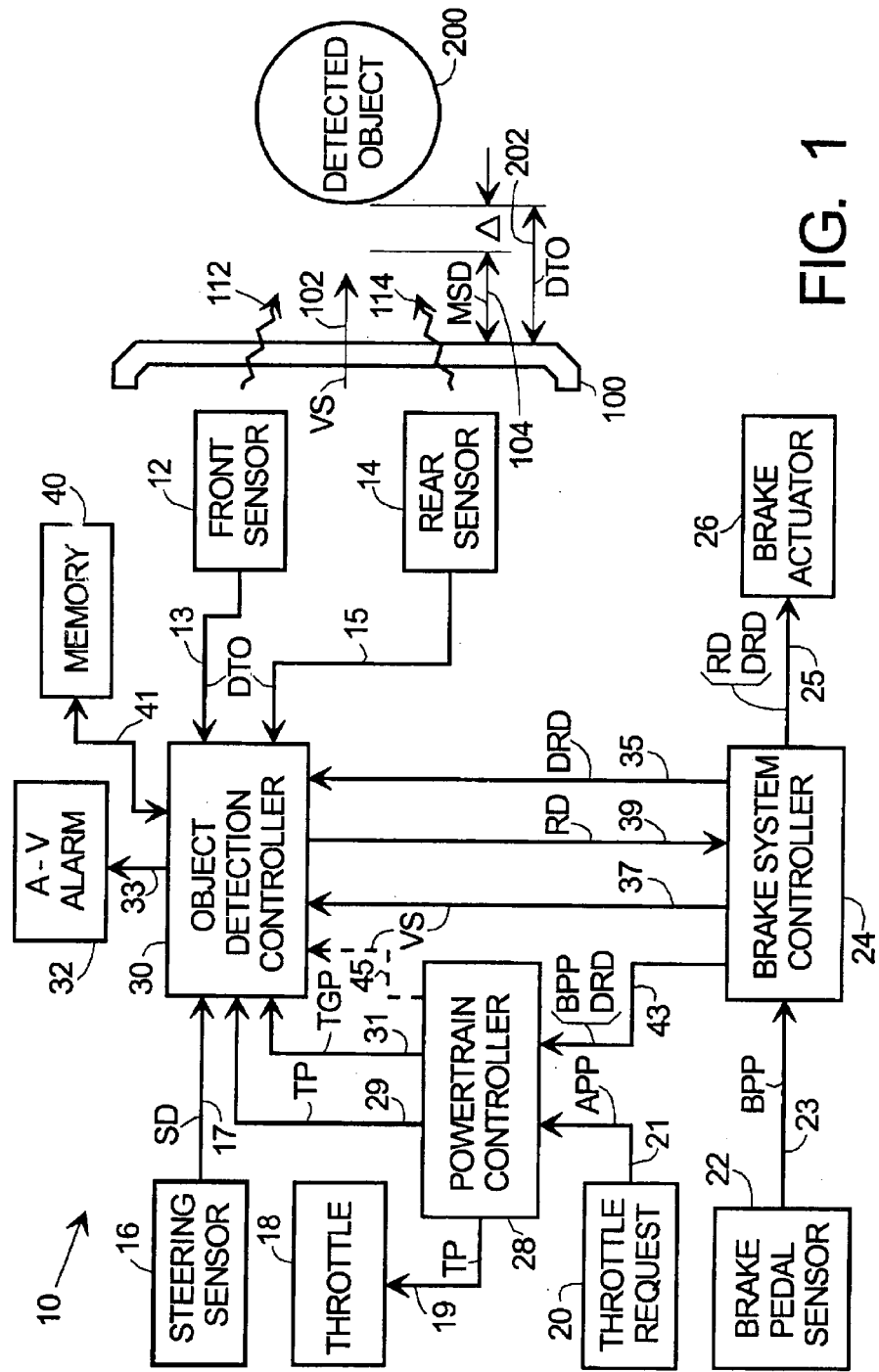
FIG. 1 is a simplified schematic block diagram of an automatic detection and braking system for parking assistance and slow moving collision avoidance, according to the present invention.

FIG. 1 is a simplified schematic block diagram of automatic detection and braking system 10 for parking assistance and slow moving collision avoidance, according to the present invention. Also illustrated in FIG. 1 is the spatial and functional relationship between vehicle bumper or fascia 100 and object 200 desired to be detected and avoided. Those of skill in the art will understand that vehicles generally have bumper or fascia 100 attached thereto. However, as used herein the words "bumper" and "fascia" are intended to represent the vehicle as a whole, even under circumstances where a literal bumper or fascia is not present on the vehicle.

For convenience of explanation, the following variables are defined. Referring now to FIG. 1, the vehicle with bumper 100 is assumed to be moving toward object 200 with a velocity defined by the variable "Vehicle Speed" (hereinafter abbreviated as "VS") in the direction of arrow 102. At the time that object 200 is detected by system 10, object 200 and vehicle bumper 100 are separated by distance 202 identified as "Distance-To-Object" (hereinafter abbreviated as "DTO"). As will be subsequently explained, system 10 will calculate, based on the operative state of the vehicle, distance 104 required to bring vehicle 100 to a stop, this distance being identified as "Minimum Stopping Distance" (hereinafter abbreviated "MSD").

Other variables, parameters and their abbreviations are identified below. For convenience of reference, the list is presented alphabetically, includes those abbreviations introduced above. For convenience of explanation, the abbreviations are identified as calculated variables, measures variables, stored parameters, or functional elements, but this is not intended to be limiting. It will be understood that the labels and acronyms given below are intended to identify the information content irrespective of the units or representation employed therefore by system 10 of FIG. 1 and method 60 of FIG. 2.

APP=Accelerator Pedal Position (measured variable);

BPP=Brake Pedal Position (measured variable);

DRD=Driver Requested Deceleration (measured or calculated variable);

DTO=Distance To Object (measured variable);

FOS=Forward Object Sensor(s) (functional element);

MSD=Minimum Stopping Distance (calculated variable);

MVS=Minimum Vehicle Speed (stored parameter);

PVP=Projected Vehicle Path (calculated vector);

RD=Required Deceleration (calculated variable);

$RD_{MAX}$=maximum possible value of RD (stored parameter);

ROS=Reverse Object Sensor(s) (functional element);

SD=Steering Direction (measured variable);

TGP=Transmission Gear Position (measured variable);

TOR=Throttle Over-Ride (stored parameter);

TD=Threshold Distance where automatic braking is actuated (calculated parameter);

TP=Throttle Position (calculated variable); and

VS=Vehicle Speed (measured variable).

System 10 comprises FOS 12 (also referred to as front sensor or forward looking sensor 12), and ROS 14 (also referred to as rear sensor or reverse looking sensor 14). FOS 12 sends data on a detected object via line or bus 13 to object detection controller 30. ROS 14 sends data on a detected object via line or bus 15 to object detection controller 30. FOS 12 and ROS 14 send location information (e.g., in-front, behind, etc.) and either distance to object (DTO) information or information from which object detection controller 30 can calculate the DTO. Either arrangement is useful. While only one FOS 12 and one ROS 14 are shown in FIG. 1, this is not intended to be limiting and it will be understood that the designations FOS and ROS can include multiple sensors looking in the same or somewhat different directions. For example, multiple sensors may be used having different sensing ranges so at to provide broader distance coverage. Also, multiple sensors oriented in slightly different directions may be used to provide information on the relative position, size and/or number of detected objects, e.g., directly ahead, off-center toward the left or right, single post or continuous barrier, and so forth. Persons of skill in the art will understand based on the description herein how to choose the number, range and orientation of sensors to suit their particular purpose and vehicle.

Object sensors are well known in the art. Non-limiting examples are ultrasonic, microwave and optical sensors. For example, such sensors emit signals 112, 114 and measure echoes received from object 200. When the echoes received from object 200 exceed a predetermined threshold, sensors 12, 14 report detection of object 200 ahead of or behind the vehicle as the case may be. By determining, for example, the time delay of the returned echoes, the combination of sensors 12, 14 and object detection controller 30 is able to determine distance 202 from the vehicle to object 200, i.e., the DTO information. Sensors 12, 14 can also provide other information about object 200, as for example and not intended to be limiting, relative closing velocity, rough size and shape, etc., but this is not essential for the present invention.

System 10 also comprises steering sensor 16, throttle actuator 18, throttle request sensor 20 and brake pedal sensor 22. Steering sensor 16 provides steering direction (SD) information concerning the orientation of the vehicle steering wheel, via leads or bus 17 to object detection controller 30 that is, is the steering wheel straight or turned and by what amount and in what direction. Throttle request sensor 20 (e.g., coupled to the accelerator pedal) sends information on the accelerator pedal position (APP) to power train controller 28 via bus or leads 21. This tells power train controller 28 how much power the operator desires the power train to provide to the vehicle and power train controller 28 calculates the corresponding throttle position (TP). Throttle actuator 18 receives throttle position (TP) information from power train controller 28 over lead or bus 19 and moves throttle actuator 18 to correspond to the received TP information. Power train controller 28 also provides TP information or equivalent to object detection controller 30 via lead or bus 29. The TP value determines the engine power setting. As will be subsequently explained, the TP information provided by power train controller 28 to object detection controller 30 over leads or bus 29 allows controller 30 to determine whether a throttle over-ride (TOR) condition exists. Power train controller 28 also sends transmission gear position (TGP) information to object detection controller 30 via leads or bus 31.

Brake pedal sensor 22 sends brake pedal position (BPP) information via leads or bus 23 to brake system controller 24. BPP is the brake pedal position set by the operator or, equivalently, the brake pedal pressure being exerted by the operator. This determines the requested braking or deceleration force that the operator desires to be applied to the vehicle by brake system controller 24, that is, the driver requested deceleration (DRD). Brake system controller 24 transmits the DRD information to object detection controller 30 via lead or bus 35 and also desirably but not essentially transmits BPP and/or DRD information to power train controller 28 via leads or bus 43. Brake system controller 24 also drives brake actuator 26 via leads or bus 25 to decelerate the vehicle in response to the DRD generated from the BPP indication or other required deceleration (RD) instructions received from controller 30.

Modern vehicles are generally equipped with anti-lock brake systems (ABS) whose function is conveniently but not essentially included in brake system controller 24 and brake actuator 26. Wheel speed is usually already known and used by brake system controller 24 in connection with its ABS function. Vehicle speed (VS) information is proportional to wheel speed, thus object detection controller 30 can conveniently derive VS related information from brake system controller 24 via leads or bus 37. However this is not essential and VS information may be obtained from other sources, for example, from power train controller 28 via leads or bus 45, where such information may be available for transmission management purposes. What is important is that VS information be available to object detection controller 30, not where it comes from.

Object detection sensors 12, 14, steering sensor 16, throttle request sensor 20 and brake pedal position or pressure sensor 22 are common features on many modern vehicles and are well known in the art. Throttle actuator 18 and brake actuator 26 are likewise common and well known in the art. Brake system controller 24 and power train controller 28 are also common and well known in the art. Persons of skill in the art will understand how to modify prior art brake system controllers to accept the required deceleration (RD) signal arriving on lead or bus 39 from object detection controller, as discussed below and pass corresponding braking instructions on to brake actuator 26.

In order to provide for automatic braking in the presence of detected object 200, object detection controller 30 generates a braking instruction for the required deceleration (RD) that it sends to brake system controller 24 via lead or bus 39. Brake system controller 24, then causes brake actuator 26 to apply the braking force corresponding to the received RD signal or command. The manner in which system 10 determines the RD signal or command is explained more fully in connection with FIG. 2. In general however, RD is the deceleration required to bring the vehicle to a stop without striking object 200. Assuming that a physically realizable solution exists, controller 30 can calculate RD based on information available within the vehicle.

Object detection controller 30 is conveniently a programmable microprocessor or micro-controller with memory 40 communicating with controller 30 via bus 41. Memory 40 may be internal to object detection controller 30 or external thereto and/or may be shared with one or more of controllers 24, 28. Either arrangement is useful. Controller 30 and memory 41 receive and store various parameters (e.g., MVS, TOR, etc.) and program instructions, illustrated for example in FIG. 2, and execute such program instructions to provide the desired automatic braking function. Persons of skill in the art will understand based on the description herein how to provide controller 30 and memory 40. Controller 30 may be a general purpose or special purpose microprocessor. Either arrangement is useful. Further, object detection controller 30, power train controller 28 and brake system controller 24 may be three separate controllers linked as shown for example in FIG. 1, or may be partially or wholly combined into one or two controller that provide such combination of functions on a time shared or other basis. Persons of skill in the art will understand how to most efficiently partition the logic required in system 10 to suit their particular vehicle, taking advantage of those functions already on-board. Accordingly, the implementation illustrated in FIG. 1 is intended as a general guide for purposes of explanation and not intended to be limiting.

Figure 2:
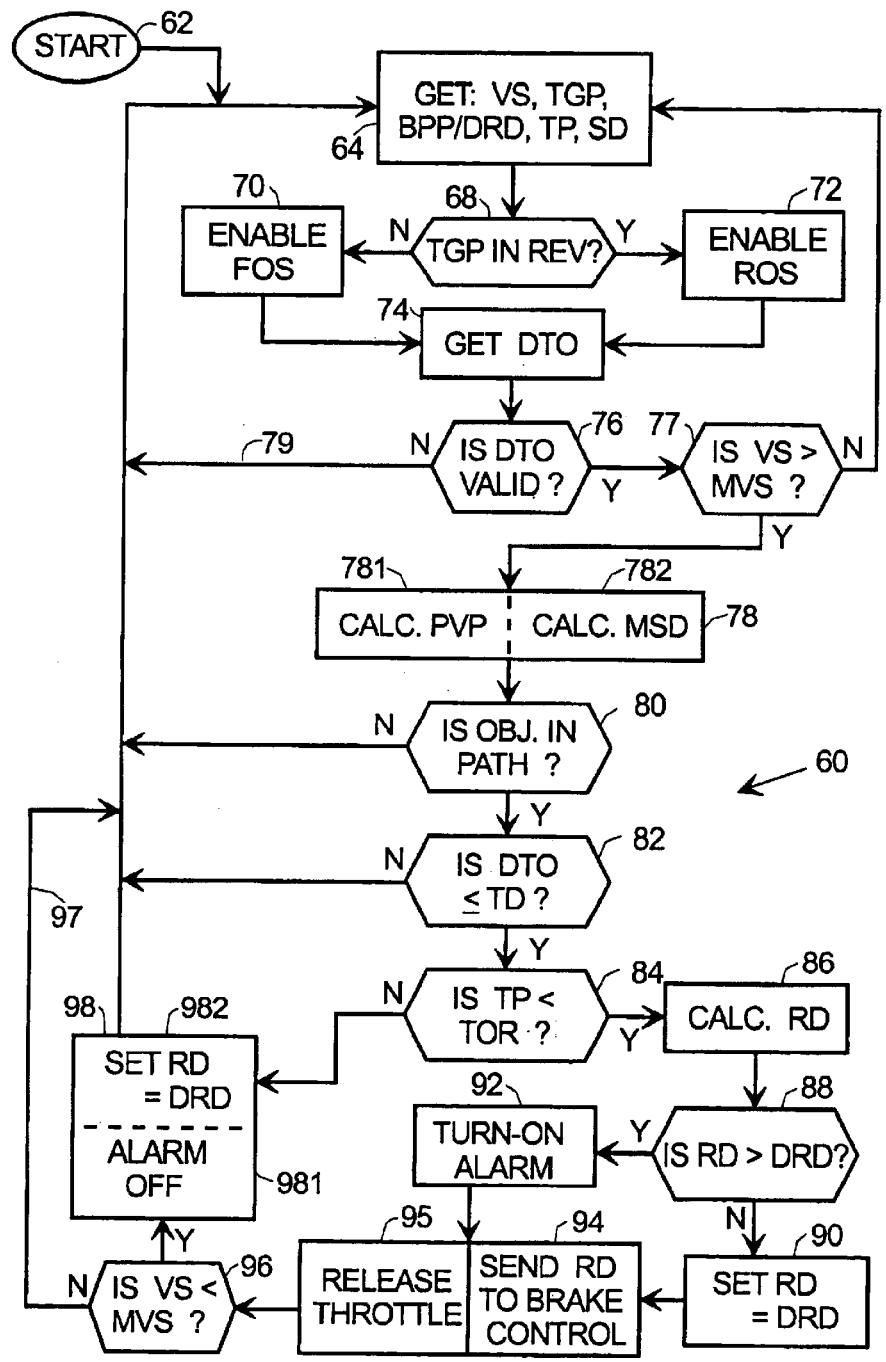
FIG. 2 is a simplified flow chart of a method for automatic detection and braking for parking assistance and slow moving collision avoidance, according to the present invention.

FIG. 2 is a simplified flow chart of method 60 for automatic detection and braking for parking assistance and low speed collision avoidance, according to the present invention. Method 60 is conveniently but not essentially executed by system 10 of FIG. 1. Other electronic systems may also be used to execute method 60. Following start 62, GET step 64 is executed wherein VS, TOP, BPP or DRD, TP and SD (or data from which these variables can be determined) are provided in any order to or by controller 30 or equivalent. Method 60 then proceeds to (TPG IN REV ?) query 68 to determine whether or not the transmission gear position (TGP) is in reverse (REV). If the outcome of query 68 is NO (FALSE) then method 60 proceeds to ENABLE FOS step 70 wherein front object sensor (FOS) 12 is activated. If the outcome of query 68 is YES (TRUE) then method 60 proceeds to ENABLE ROS step 72 wherein rear object sensor (ROS) 14 is activated. Persons of skill in the art will understand that FOS 12 and/or ROS 14 may comprise multiple sensors.

Method 60 then proceeds to GET DTO step 74 wherein a DTO value (or equivalent data) is read from the appropriate sensor and transmitted to object controller 30 via leads or bus 13 or 15. Alternatively, DTO may be calculated by controller 30 based on data obtained from FOS 12 or ROS 14. Method 60 then proceeds to optional (IS DTO VALID ?) query step 76 wherein it is determined (for example, using controller 30 and information stored in memory 40) whether the DTO value reported in step 74 is likely to be valid. Spurious echoes, multi-moding and other effects known in the art can sometimes cause more distant objects appear to be closer than they actually are. Thus, it is desirable but not essential to test the DTO data received in step 74 for validity. If the outcome of query 76 is NO (FALSE) then control returns to GET step 64 via path 79. Persons of skill in the sensor art will understand based on the description herein how to test DTO data for validity and return control to GET step 64. While data validation query 76 is desirable it is not essential, and method 60 may proceed on the basis of the first value of DTO obtained in step 74 or a YES (TRUE) outcome of query 76.

Controller 30 or equivalent then executes query 77 to determine whether or not the vehicle is moving above a minimum vehicle speed value (MVS). The MVS can conveniently be, for example, the smallest value of VS that can be reliably measured, or alternatively, the speed below which automatic braking control is not needed. In either case, MVS is the speed below which no further action is desired from system 10. The MVS value can be conveniently stored in memory or otherwise provided. If the outcome of query 77 is NO (FALSE), then the process loops back to GET step 64 until VS rises above the threshold MVS value. When the outcome of query 66 is YES (TRUE), then the method proceeds to step 78.

Having obtained VS, TGP and SD in GET step 64, direction information in step 68 (e.g., forward or reverse), object location (e.g., object is in the sensor detection pattern) and DTO data in steps 70–74, then in step 78, controller 30 or equivalent calculates (in either order) the projected vehicle path (PVP) vector in sub-step 781 and calculates the minimum stopping distance (MSD) in sub-step 782. The MSD desirably takes into account the maximum braking capabilities of the vehicle based on information about the vehicle stored, for example, in memory 40 and is the minimum distance in which the vehicle can be brought to a stop under the circumstances. Information about the braking traction available in the vehicle's regular automatic braking system (ABS) may optionally be used to take into account variations in the road surface and tire friction, but this is not essential. Sub-steps 781, 782 may be carried out in either order.

The results of step 78 are passed to (IS OBJ. IN PATH ?) query step 80 wherein it is desirably determined whether or not the projected vehicle path (PVP) vector obtained in step 78 is likely to intersect the detected object whose distance (DTO) and general location are already known from steps 70–74. If the outcome of query 80 is NO (FALSE) then automatic braking is not necessary and control returns to GET step 64. If the outcome of query step 80 is YES (TRUE) then (IS DTO$\leq$TD?) query step 82 is executed, where TD is a Threshold Distance preferably based at least in part on MSD, that is TD=f(MSD). In a preferred embodiment Threshold Distance TD=k1*MSD+k2 using the MSD value obtained in step 78, and k1 and k2 are predetermined parameters. Parameters k1, k2 may be constants stored, for example, in memory 40. Alternatively, k1 and k2 may depend upon currently observed variables as for example but not limited to, vehicle speed, braking conditions and/or other factors.

Query step 82 takes into account the stopping capabilities of the vehicle (expressed by MSD and parameters k1, k2). Parameter k1 is dimensionless and parameter k2 has dimensions consistent with the dimensions in which DTO is measured, e.g., meters, feet, time, etc. Parameter k1 is usefully (but not essentially) selected based upon the maximum deceleration to which the vehicle passengers should be subjected during automatic braking. Parameter k2 is effectively an offset included to provide a stopping distance margin of a pre-determined number of feet or meters or seconds, etc. In the preferred embodiment, k2>0. Parameter k1 is conveniently in the range 1<k1<2 but larger or smaller values can also be used. Generally, k1 should be chosen to limit the maximum braking deceleration to 1 G or less. Parameter k2 is conveniently in the range 0<k2<X where X can be determined, for example, by approximately VSmax*t1 where t1 is a typical system reaction time for vehicle braking and VSmax is the largest value of VS that the system is intended to handle. Braking system response times are typically of the order of about $10^{-1}$ seconds but larger or smaller values of t1 can also be used. Convenient values of k2 are about one to two times VSmax*t1. Parameter k2 can also be determined in other ways and has the effect of providing a stopping distance margin. Persons of skill in the art will understand how to choose k1 and k2 depending upon their particular vehicle and requirements.

The values of k1 and/or k2 can be constant or, as will be subsequently explained, can depend upon the vehicle operating conditions.

If the outcome of query 82 is NO (FALSE) then the current DTO value is still large enough that human intervention to stop the vehicle is feasible and control returns to GET step 64, leaving the braking decision to the operator. If the outcome of query 82 is YES (TRUE) then the current DTO is now at or within the predetermined Threshold Distance TD=f(MSD) where automatic braking is desired. The effect of query 82 is to leave the braking decision to the operator until DTO reaches the automatic braking threshold value TD=f(MSD), whereupon automatic braking is initiated without operator intervention.

TD expresses the threshold value where automatic braking intervenes. The value of TD may be a constant for a particular vehicle type or may depend upon vehicle operating conditions. For example, as Vehicle Speed (VS) increases, the vehicle will travel further during the operator reaction time and during the braking system response time. Therefore, it may be desirable to have automatic braking intervene at a larger distance from the object when the vehicle is moving faster. This is conveniently accomplished by having TD increase with increasing vehicle speed, that is to have TD=f(MSD,VS). This is conveniently (but not essentially) accomplished by having TD=k1*MSD+k2, where one or both of k1=f1(VS) and/or k2=f2(VS). For example, for braking system response times of the order of 0.1 second, k2 values of the order of 0.1*VS to 0.2*VS or larger are convenient, where VS is the vehicle speed obtained in GET step 64. In this implementation, the value of k2 is adaptive and depends upon the actual value of VS at the time that method 60 is executed rather than a fixed VSmax as discussed earlier. Similarly, the value of MSD calculated by system 10 may depend upon road conditions as well as velocity. Thus, TD varies with other parameters besides VS. While the relationship TD=k1(VS)*MSD(VS)+k2(VS) is convenient, other functional relationships may also be used whereby TD varies with VS and, optionally, with other vehicle characteristics or operating conditions. Persons of skill in the art will understand based on the description herein how to determine appropriate values and dependency of TD on MSD, VS, k1, k2 and other factors. While TD is illustrated as depending linearly upon MSD and k1, k2, persons of skill in the art will understand that other functional relationships can also be used and that the present invention is not limited by the particular functional relation ships illustrated herein.

Following a YES (TRUE) outcome of query 82, then (IS TP<TOR ?) query 84 is executed wherein it is determined whether or not the throttle position (TP) determined in step 64 is less than a predetermined value referred to as the throttle over-ride (TOR) value. TOR is a stored parameter whose value depends upon the vehicle characteristics. Those of skill in the art will understand based on the description herein how to choose TOR for their particular vehicle and application. A NO (FALSE) output from query 84 indicates that sufficient engine power is being applied to overcome the brakes and therefore braking may be only partially ineffective. It is possible that the operator is pressing on both the brake and the accelerator pedals at the same time. Even though the engine power setting indicated by TP>TOR may be large enough to over-ride the brakes, it is desirable that whatever DRD level is being requested by the operator be maintained. Under these circumstances, control passes to step 982 wherein the Required Deceleration (RD) is set equal to the Driver Requested Deceleration (DRD) whatever that is, and control returns to GET step 64 and the system recycles. If the outcome of (IS TP<TOR ?) query 84 is YES (TRUE) then method 60 advances to CALC. RD step 86 wherein a required deceleration (RD) value is calculated by controller 30, that is, the value of deceleration or braking force needed to reduce the vehicle speed and desirably bring it substantially to a stop before hitting object 200.

After calculating RD in step 86, method 60 then proceeds to query 88 wherein it is determined whether or not the required deceleration (RD) value determined by controller 30 is greater than the driver requested deceleration (DRD) value obtained from the brake pedal position or pressure (BPP) determined in step 64. Thus, query 88 tests to see whether the deceleration RD calculated by automatic braking system 10 is greater than the deceleration that would result from the driver's pressure on the brake pedal. If the driver is not pressing on the pedal or only pressing very lightly, then system 10 will exert control to try to bring the vehicle to a stop. Conversely, if the operator is pressing on the brake pedal to produce a deceleration DRD greater than that generated by system 10, then, as will be subsequently explained, system 10 defaults to the operator controlled braking value DVD.

If the outcome of query 88 is YES (TRUE) then method 60 advances to step 92 wherein alarm 32 (see FIG. 1) apparent to the driver is turned on via lead or bus 33 (see FIG. 1). Alarm 32 can be audible, visual or both and should be of location and magnitude to alert the driver that system 10 is providing automatic braking to try to avoid collision with object 200. This is important because the operator may not be aware of object 200. Method 60 then performs steps 94, 95 in either order. In step 94, the RD value and/or RD command is sent via leads or bus 39 to brake system controller 24 which in turn sends an appropriate command to brake actuator 26 via leads or bus 25 causing the vehicle to decelerate at the rate specified by the RD value or command. In step 95, the throttle is released, for example, set to an idle condition. If the outcome of query 88 is NO (FALSE) indicating that the vehicle operator is braking at the same or a larger rate than the value of RD determined by automatic system 10, then in step 90 RD is set equal to the driver requested deceleration (DRD) and the result transferred to steps 94–95 in either order, where, as noted above for step 94, the RD value is sent to the braking system to halt the vehicle, and as noted above for step 95, the throttle is released. The combination of steps 94, 95 conveniently insure that the throttle is not being advanced when the brakes are applied. The legends RD and DRD are indicated on leads or bus 25 in FIG. 1 to indicate that the braking command being sent to brake actuator 26 is based in part on one or the other of these values.

Following step 94 during which brake actuator 26 (see FIG. 1) causes the vehicle brakes to be applied, method 60 executes (IS VS<MVS ?) query step 96 to determined whether the vehicle has effectively come to a stop. If the outcome of query 96 is NO (FALSE) then the process desirably loops back to GET step 64 as indicated by path 97, whereupon the logical steps 64–94 are repeated until the condition defined by query 96 is satisfied. This is desirable to deal with the situation where the object detected during an initial pass through steps 64–94 is transient, e.g., another vehicle or some object that is only momentarily visible to sensors 12, 14. As method 60 recycles through steps 64–94, if the object is no longer detected then RD calculated in step 86 is zero and the brakes are released or set to DRD as the case may be if the operator is braking. When query 96 yields YES (TRUE) indicating that the vehicle has substantially come to a stop, then method 60 proceeds to step 98, preferably but not essential first to sub-step 981 wherein, if alarm 32 is ON it is turned OFF, and then to sub-step 982 where RD is set equal to DRD, the driver requested deceleration, if any. If DRD=0, then the brakes are released. If DRD>0, then the driver requested deceleration DRD is maintained until released by the driver. Following SET DR=DRD step 982, method 60 returns to GET step 64. Persons of skill in the art will understand based on the description herein that sub-steps 981, 982 may be performed in either order.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. While the steps illustrated in method 60 have been presented in a certain order, those of skill in the art will appreciate that various steps and queries can be executed in other orders, and the sequences of FIGS. 2–3 are intended for convenience of description and not intended to be limiting. For example, queries 80–84 can be performed in any order and steps 781, 782 and 981, 982 can be performed in any order. Additionally, step 77 may be performed before or after steps 68–76. Further as noted in the foregoing description, not all of the steps presented in method 60 are essential.

Query step 82 in FIG. 2 has the purpose of determining whether a vehicle traveling at VS has reached DTO≦TD where automatic braking should intervene. Query step 82 is illustrated in terms of comparing DTO to TD described in terms of MSD and k1, k2. However persons of skill in the art will understand that this is merely for convenience of description and that query step 82 could equally well be framed in terms of speed or stopping time. For example, dividing each element of the equation DTO≦TD by velocity yields VS an equivalent expression ST≦c1*MST+c2 where ST is the current stopping time at velocity VS (e.g., 2*DTO/VS assuming linear deceleration) and MST is the minimum possible stopping time (e.g., 2*MSD/VS) and c1, c2 are parameters equivalent to k1, k2 but for the time domain. Similarly, dividing DTO≦TD by time yields and equation VS≦c3*VM+c4 where VM is the maximum velocity above which the vehicle cannot be halted before striking the object and c3, c4 are parameters analogous to k1, k2 but in the velocity domain. Thus, any equivalent means of testing whether automatic braking should be initiated is useful and the present invention is not limited merely to the test described in connection with DTO. Further, while the above description assumed linear deceleration, this is not essential and persons of skill in the art will understand based on the description herein how to perform equivalent calculations and tests for non-linear deceleration.

Hence, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for controlling a braking system of a vehicle that is moving toward an object, comprising:
   a vehicle speed (VS) sensor;
   a steering direction (SD) sensor;
   at least one sensor configured to provide a distance to the object (DTO);
   a processor in operable communication with the braking system and configured to receive the VS, the SD and DTO, said processor further configured to:
   (i) determine a projected vehicle path (PVP) and a minimum stopping distance (MSD) for the vehicle based at least in part on the VS and the SD;
   (ii) determine whether the object is in the PVP and whether the DTO is less than or equal a threshold distance (TD);
   (iii) determine a required deceleration (RD) for the braking system to substantially reduce the vehicle speed if the object is in the PVP and the DTO is less than or equal the threshold distance (TD); and
   (iv) communicate the RD to the braking system.

2. The system of claim 1 wherein the threshold distance TD depends at least in part on MSD.

3. The system of claim 1 further comprising a brake pedal sensor coupled to the processor for determining a driver requested deceleration (DRD) for the vehicle.

4. The system of claim 3 wherein the processor compares DRD and RD and communicates said DRD to the braking system if said DRD is greater than said RD.

5. The system of claim 1 further comprising a first device coupled to the processor for determining whether a throttle request and a second device coupled to the processor for producing an engine power setting corresponding to the throttle request.

6. The system of claim 5 wherein the processor compares the engine power setting to a predetermined value and if the engine power setting exceeds the predetermined value, communicating a driver requested deceleration (DRD) to the braking system.

7. The system of claim 1 wherein the at least one sensor comprises a first sensor directed in a first direction of the vehicle and at least a second sensor directed in a second direction substantially opposite said first direction.

8. A method for controlling a braking system of a vehicle that is moving toward an object, the method comprising the steps of:
   measuring a vehicle speed (VS);
   measuring a steering direction (SD);
   measuring a distance to the object (DTO);
   calculating a projected vehicle path (PVP) and minimum stopping distance (MSD) for the vehicle based at least in part on the VS and the SD;
   determining whether the object is in the PVP and whether the DTO is less than or equal to a threshold distance (TD);
   calculating a required deceleration (RD) for the braking system to substantially reduce the vehicle speed if the object is in the PVP and the DTO is less than or equal to the TD; and
   communicating the RD to the braking system.

9. The method of claim 8 wherein the TD depends at least in part on the MSD.

10. The method of claim 8 further comprising the step of sensing a driver requested deceleration (DRD) for the vehicle.

11. The method of claim 10, further comprising the step of comparing the DRD and the RD and communicating the DRD to the braking system if the DRD is greater than the RD.

12. The method of claim 8 wherein TD=k1*MSD+k2 and k1 and k2 are predetermines parameters of the vehicle.

13. The method of claim 8 wherein TD is determined at least in part based on VS.

14. The method of claim 8 further comprising the steps of:

determining a transmission gear position of the vehicle;

actuating rear sensors to determine the DTO if the transmission gear position indicates a reverse direction of motion for the vehicle; and actuating front sensors to determine the DTO if the transmission gear position indicates a forward direction of motion for the vehicle.

15. A system for controlling a braking system of a vehicle that is moving toward an object, comprising:

a first sensor configured to detect the object in a first direction of the vehicle and determine a distance to the object (DTO) if the object is in said first direction;

a second sensor configured to detect the object in a second direction of the vehicle and determine the DTO if the object is in said second direction;

a steering sensor for determining a steering direction (SD);

a brake pedal sensor for determining a driver requested deceleration (DRD) of the vehicle;

a speed sensor for determining a vehicle speed (VS)

a processor in operable communication with the braking system and configured to receive the DTO, SD, DRD and VS, said processor further configured to:
  (i) calculates a projected vehicle path (PVP) and minimum stopping distance (MSD) based at least in part upon said VS and the SD;
  (ii) determines whether the object is in PVP and whether the DTO is less than or equal a threshold distance (TD) based at least in part on the MSD;
  (iii) calculates a required deceleration (RD) for the braking system to substantially reduce the vehicle speed if the object is in the PVP and the DTO is less than or equal to the threshold distance (TD);
  (iv) compares the DRD and the RD and communicates the DRD to the braking system if said DRD is greater than said RD; and
  (iii) communicating the RD to the braking system if the DRD is less than said RD.

* * * * *